United States Patent [19]

Spektor et al.

[11] Patent Number: 5,029,604
[45] Date of Patent: Jul. 9, 1991

[54] SAFETY CORE FOR TIRE VALVE

[76] Inventors: Semyon Spektor, 766 33rd Ave.;
Mark Gozokhovsky, 490 - 33rd Ave.
206; Ilya Zhabokrug, 754 38th Ave.,
all of San Francisco, Calif. 94121

[21] Appl. No.: 481,954
[22] Filed: Feb. 20, 1990
[51] Int. Cl.⁵ .................. F16K 15/20; F16K 17/26
[52] U.S. Cl. ............................ 137/226; 137/493.3;
137/493.6; 137/493.9
[58] Field of Search ............. 137/226, 493.1, 493.3,
137/493.6, 493.9

[56] References Cited

U.S. PATENT DOCUMENTS

| | | | |
|---|---|---|---|
| 1,335,976 | 4/1920 | Leach | 137/226 |
| 1,934,572 | 11/1933 | Sutton | 137/226 |
| 2,254,655 | 9/1941 | Hollowell | 137/226 |
| 2,517,917 | 8/1950 | Payne | 137/226 |
| 2,606,570 | 8/1952 | Buenik | 137/226 |
| 3,450,147 | 6/1969 | Webb | 137/226 |

Primary Examiner—John Rivell

[57] ABSTRACT

A safety core (10) for a tire valve comprises a head portion (12) screwed into the valve's housing (28) so that it is sealed against the inner wall of the housing by compressing a seal ring (36) located in an annular groove (34) formed in a tapered portion (32) of the head part. Inserted into the head part is a cylindrical body (14) which contains a ball-type check valve (20). A ball (84) of the valve is constantly pressed to a seat (80) installed on the rear end of an adjustment pipe (16), the latter being screwed into the rear end of the body (14). The rear end protrudes through the head portion (12) and has a stop (58) on its end. A spring (62), located between the stop (58) and the outer end face of the head portion (12), constantly urges the front end of the head portion (12) to a valve seat formed on a shoulder (68) of a large-diameter portion (66) of the cylindrical body. A spring (86), which keeps the check valve normally in a closed state, is adjusted to a predetermined maximum allowable pressure of the tire. When this pressure is exceeded, e.g., because of an extraordinary load, sustained high-speed drawing, or high temperature, the air in the tire opens the check valve and is released through gaps in the safety core.

16 Claims, 2 Drawing Sheets

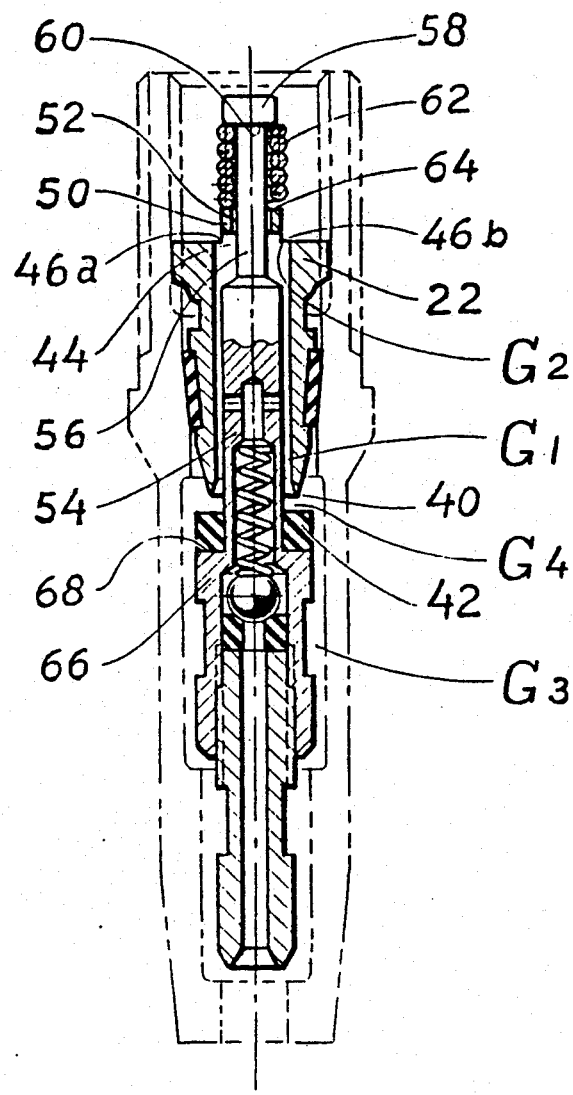
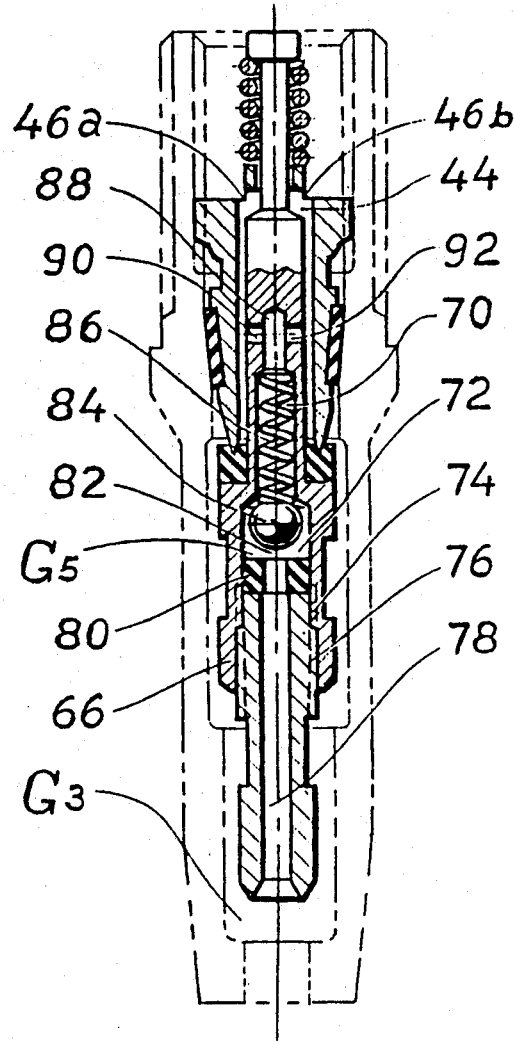
FIG. 2.  FIG. 3.
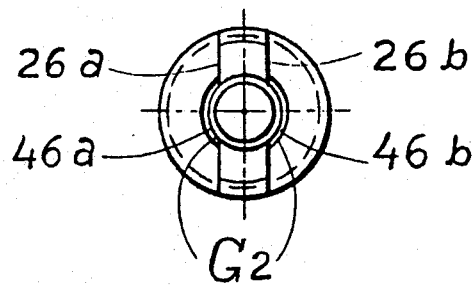
FIG. 4.

SAFETY CORE FOR TIRE VALVE

BACKGROUND

1. Field of the Invention

The present invention relates to a tire valves, particularly to safety inflation and deflation valves and a core for such valves.

BACKROUND

2. Description of Prior Art

Vehicle tire manufacturers recommend that tire pressure be measured under a normal load (i.e., a vehicle with one or two occupants) and moderate temperature, i.e., about +20° C. (68° F.).

During driving, however, the tire may experience extreme conditions, such as a high ambient temperature, an increased load, and/or a long period of high-speed driving. Such extreme conditions may increase the pressure inside the tire to a value exceeding its upper allowable limit. This may cause the tire to blowout, i.e., violently rupture and tear, causing a total loss of pressure and collapse of the tire.

In the past, many types of valves have been devised to release excess pressure if it exceeds a predetermined maximum allowable level. One such device is described in U.S. Pat. No. 3,491,786 to Richard L. Crossman, 1970. This device comprises a valve which uses a conventional core and housing in combination with an additional, external, spring-biased sliding sleeve-type pressure-relief valve system, which opens the valve when the tire's internal pressure reaches a certain predetermined value.

Crossman's device has several disadvantages. Since the relief valve is external, the tire has increased radial and axial dimensions. Also a special threaded hole in the wheel rim is required for attachment of the device. Moreover, it has a complex construction, it is impossible to use the device with standard tire valves, it has a high manufacturing cost, and requires extensive labor for assembly.

We believe that because of the above-disadvantages, Crossman's device did not enjoy commercial success.

OBJECTS OF THE INVENTION

It is therefore an object of the present invention to eliminate the above disadvantages of known safety devices for tire valves, i.e., to provide a safety device which can be arranged inside a standard valve housing, which does not extend beyond overall dimensions of the conventional valve housing either in the axial or the radial direction, which eliminates the necessity of drilling a special threaded hole in the wheel rim, has a simple construction, and which is easy and inexpensive to manufacture and assemble. Further objects and advantages will become apparent after consideration of the ensuing description and the accompanying drawings.

BRIEF DESCRIPTION OF THE DRAWINGS

FIG. 2 is the same view as in FIG. 1, but showing just the safety device and the positions of its parts during inflation.

FIG. 3 is the same view as in FIG. 2 showing the positions of the parts during deflation or excessive pressure release.

FIG. 4 is a view in the direction of arrow A in FIG. 1.

Figure 1:
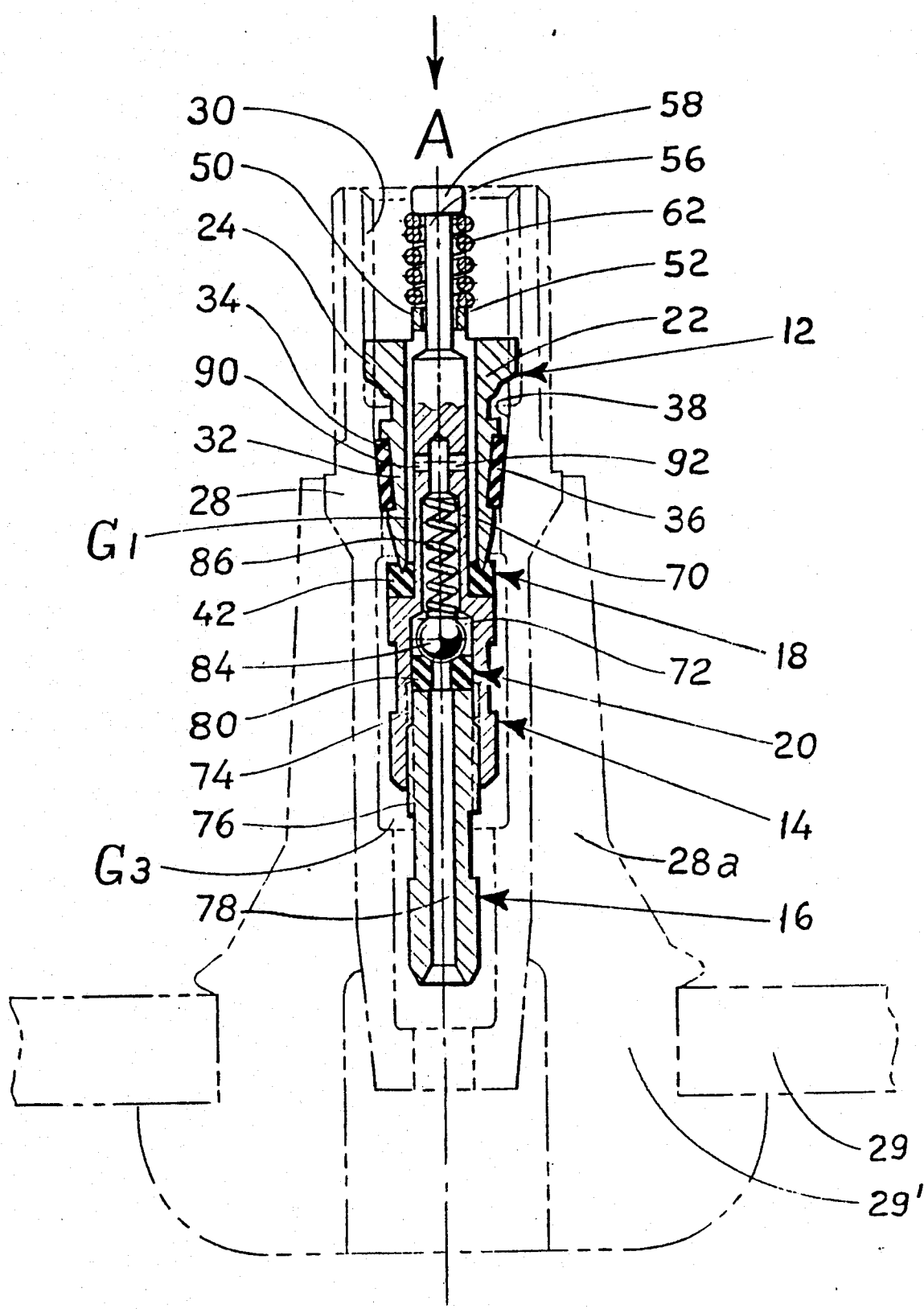
FIG. 1 is a longitudinal sectional view of a tire valve safety device of the invention under normal working conditions, including a rubber sleeve and part of the wheel rim.

Reference Numerals Used in the Description and Drawings

12—head portion
14—cylindrical body
16—adjustment pipe
18—stop valve
20—check valve
22—head
24—external thread
26a, 26b—flats
28—tire valve housing
28a—rubber sleeve
29—wheel rim
29'—wheel rim hole
30—internal thread
32—taper portion
34—annular groove
36—seal ring
38—inner taper wall
40—front end of head portion
42—resilient seat
44—inner bore
46, 46b—passages
50—bottom of head portion
52—through hole
54—rear end
56—small-diameter portion
58—stop
60—end face
62—cylindrical spring
64—outer side
66—large-diameter portion
68—shoulder
70—small-diameter portion
72—large-diameter hole
74—inner thread
76—outer thread
78—through hole
80—valve seat
84—ball
86—spring
88—axial hole
90, 92—transverse holes
G2, G3, G4, G5—first, second, third, and fourth gaps, respectively.

FIGS. 1–4—DETAILED DESCRIPTION OF THE CORE OF THE INVENTION

A tire valve safety core of the invention, hereinafter referred to simply as a core, is shown in FIGS. 1 to 4. FIG. 1 is a longitudinal sectional view of the core (and a rubber sleeve as a part of a wheel rim) under normal working conditions, FIG. 2 is the same view of just the core during inflation, FIG. 3 is the same view of the core during deflation, and FIG. 4 is a view in the direction of arrow A of FIG. 1.

The core consists essentially of a head portion 12, a cylindrical body 14, an adjustment pipe 16, a stop valve 18, and a check valve 20.

Head portion 12 has a head 22 with an external thread 24 and flats 26a and 26b for twisting the entire core into a standard tire valve housing 28 (shown in phantom lines) by means of an end wrench (not shown). Flats 26a and 26b are clearly shown in FIG. 4 which is a view taken in the direction of arrow A in FIG. 1. Housing 28 is a conventional and standard part which is installed in a rubber sleeve 28a. Sleeve 28a with housing 28 is then conventionally installed in a hole 29' in a standard automobile wheel rim, such as rim 29 (shown in a partial view in phantom lines). A tire (not shown) is mounted on wheel rim 29 in conventional fashion so that the area below wheel rim 29 in FIG. 1 is inside the tire and is normally under pressure, and the area above is outside the tire and is at atmospheric pressure. Housing 28 has an internal thread 30 for engagement with the thread of a conventional valve core (not shown). Therefore external threads 24 of head 22 are the same as those on a conventional valve core.

Head portion 22 also has a taper portion 32 with an external annular groove 34 which receives a taper seal ring 36. When the core is installed into valve housing 28 by threading head 22 into thread 30, seal ring 36 is compressed against an inner taper wall 38 of housing 28 and thus seals the tire (not shown). Seal ring 36 is always in a sealed position, i.e., under normal working conditions, as well as during inflation (FIG. 2) or deflation (FIG. 3).

A front end 40 (FIG. 2) of head portion 22, i.e., the end opposite to head 22, is sharpened and sealingly engages a resilient seat 42 formed on the facing end of cylindrical body 14 which will be described later. The sharpened ends of head portion 22 and seat 42 form parts of stop valve 18. Head portion 12 has a bore 44 which is connected through passages 46a and 46b in the bottom 50 of the head portion to the atmosphere. Passages 46a and 46b are formed automatically by milling the above-mentioned flats 26a and 26b when the cutting plane intersects bore 44. Hereinafter passages 46a and 46b will be designated as gap G2 which will be described later in connection with operation of the core. Bottom 50 has a through hole 52.

Inserted into bore 44 is a rear end 54 of cylindrical body 14. The outer diameter of rear end 54 is smaller than the inner diameter of bore 44, so that a first gap G1 is formed between the peripheral surface of rear end 54 and bore 44. Rear end 54 has a small-diameter portion 56 which passes through hole 52 outside head 22. The protruding part of portion 56 has a head or stop 58, e.g., in the form of a retaining ring or a cylindrical part screwed onto portion 56. Stop 58 has a greater diameter than portion 56, so that its end face 60 serves as a support for one end of a cylindrical spring 62. The opposite end of spring 62 rests on an outer side 64 of head-portion bottom 50.

Portion 56 and stop 58, which is in the form of a protruding button, have the same configuration as the respective elements of a conventional valve cores for interaction with a standard air nozzle of tire inflation systems.

The parts and elements described above are the same as in a conventional tire valve core. The following description will concern the invention.

At its end opposite to head 22, body 14 has a large-diameter front portion 66. Seat 42 is press-fitted onto a small-diameter portion 56 and rests on a shoulder 68 formed by portion 66. Portion 66 has a stepped bore which consists of a small-diameter hole 70 and a large-diameter hole 72. Large hole 72 has an inner thread 74. Adjustment pipe 16 has an outer thread 76 which is screwed into inner thread 74. Pipe 16 has a through hole 78. The end of pipe 16 facing head 22 supports a valve seat 80 for a mating ball 84. Seat 80 may comprise a resilient ring tightly fitted into the bore of front portion 66. Ball 84 is normally pressed to seat 80 by a spring 86 located in small hole 70 between ball 84 and the bottom of hole 70. Ball 84, seat, 80, and spring 86 form check valve 20. Hole 70 is connected via an axial hole 88 and transverse holes 90 and 92 to gap G1, and hence to the atmosphere, via gap G2, i.e., passages 46a and 46b. A third gap G3 is also formed between the inner surface of valve housing 28 and the entire periphery of body 14. Gap G3 and the interior of pipe 16 are always connected to the tire chamber below wheel rim 29.

The force of spring 86 of check valve 20 is adjusted by screwing or unscrewing pipe 16. This force determines the maximum allowable pressure in the tire (not shown).

Core 10 has essentially the same dimensions as a standard tire valve core, so that it can be inserted into standard tire housing 28. After assembly it has the same axial and radial dimensions as a standard tire valve.

The device is screwed by means of its external thread 24 and with the use of flats 26a and 26b (FIG. 4) into inner thread 30 of housing 28 to the extent that communication between gap G3 and the atmosphere is sealed by compression of seal ring 36. Body 14 can slide inside head 22 and is retained in it through the engagement of the rear end of spring 60 with stop 58. Body 14, in turn, supports adjustment pipe 16 by engagement of external thread 76 with inner thread 74.

FIGS 1–3—OPERATION DURING INFLATION

When the tire is under normal pressure, the parts are as shown in FIG. 1. In this case, communication between gap G1 and the tire chamber is closed by check valve 20, i.e., ball 84 is pressed to its seat 42 by spring 86. The latter is adjusted by pipe 16 to a predetermined pressure which corresponds to the upper allowable limit of pressure in the tire.

To inflate the tire, the operator inserts the tip of a nozzle of a conventional compressed-air line (not shown) onto housing 28. This presses down stop 58, compresses spring 62, and opens the nozzle. As a result, body 14 is shifted down, i.e., from the position shown in FIG. 1 to the position shown in FIG. 2, so that gap G4 is formed between front end 40 of head portion 12 and seat 42. Compressed air penetrates from the nozzle through gap G2 into gap G1, and flows through gap G4 into gap G3, and then into the tire.

The tire will be inflated until the nozzle of the compressed air system is removed, allowing stop 58 to return up to its normal position (FIG. 1). I.e., when the force of spring 86 overcomes the tire chamber pressure, this will close check valve 20 by seating ball 84 onto its seat 80. In practice, completion of the inflation operation is determined by watching the inflation state of the tire, slightly overinflating the tire, disconnecting the tire valve from the source of compressed air, and then manually pressing stop 58 to let the pressure drop automatically to the adjusted level. The working pressure in the chamber will be further automatically adjusted during operation of the tire, as will be described.

FIGS 1–3—OPERATION DURING AUTOMATIC RELEASE OF EXCESS PRESSURE

When, during use of the tire, its pressure increases to the level exceeding the maximum allowable pressure, e.g., because of an extremely high ambient temperature, a high load, or a long period of high-speed driving, the excess pressure will be released automatically. This occurs because such pressure will overcome the force of spring 86, open check valve 20, and release a portion of air from the tire through gap G5, axial hole 88, transverse holes 90, 92, and gaps G1 and G2. This will protect the tire from blowout. If the core has released the excess pressure and the tire later cools down, its pressure will be reduced to a level below normal. The owner should then reinflate the tire to normal pressure. The reduction of pressure can be detected when the owner makes the normal recommended periodic pressure check.

The inventive core is adjusted at the manufacturer's facilities by turning pipe 16 and simultaneously reading the scale of a pressure gauge connected to the pressure source. After adjustment is completed, the position of pipe 16 in cylindrical body 14 is fixed, e.g., by placing an adhesive in the threaded connection between the both parts.

SUMMARY, RAMIFICATIONS, AND SCOPE

As we have shown, our tire valve safety core is mountable inside a standard valve housing and does not extend beyond overall dimensions of the conventional valve housing, either in the axial or the radial direction. This eliminates the necessity of drilling a special threaded hole in the wheel rim, provides a simple construction, and is easy and inexpensive to manufacture and assemble.

Although the invention has been shown and described in the form of the preferred embodiment, it is understood that its parts and configurations were given only as examples, and that many other modifications of the core are possible. For example, instead of a ball-type check valve, it may comprise a leaf-spring type valve. Head portion 12 can be formed without flats 26a and 26b, and passages 46a and 46b can be used for engagement with pins on a wrench. Instead of using a removable stop 58, it can be made integral with the small-diameter portion, which can be screwed into rear end 54 of cylindrical body 14. Therefore the scope of the invention should be determined, not by examples given, but the appended claims and their legal equivalents.

What we claim is:

1. A safety core for a tire valve, comprising:
   means for attaching said core to a standard tire valve housing, which housing is connected to a tire chamber, and means for sealingly engaging said core with an inner wall of said standard tire valve housing;
   a head portion having a hole;
   a cylindrical body slidingly inserted into said hole of said head portion so as to form first and second gaps which are connected to the atmosphere, said cylindrical body having a bore;
   a stop valve between said head portion and said cylindrical body;
   resilient means normally maintaining said stop value in a closed position;
   a spring-loaded choke valve in said bore between said pipe and said first gap, said choke valve normally closing communication between said pipe and said first gap; and
   a third gap formed between the outer periphery of said cylindrical body and the inner surface of said standard tire valve housing, said third gap and the interior of said pipe being connected to said tire chamber, said choke valve being closed by a force adjusted to a predetermined upper allowable pressure for said tire chamber.

2. The safety core of claim 1 wherein said means for attaching said core to a standard tire valve housing comprises a head with an outer thread engageable with an inner thread in said standard tire valve housing, said head portion having a tapering portion with an annular groove, and said means for sealingly engaging said inner wall of said standard tire valve housing comprises a resilient seal ring inserted into said groove.

3. The safety core of claim 2 wherein said head portion has means for screwing it into said standard tire valve housing by means of an end wrench.

4. The safety core of claim 3 wherein said means for screwing said head portion comprise two diametrically arranged flats formed on said head of said head portion.

5. The safety core of claim 1 wherein said cylindrical body has a rear end, a large-diameter portion on the end facing said tire chamber, and a small-diameter portion on the side opposite to said tire chamber, said head portion having a bottom with an opening, said small-diameter portion protruding through said opening of said bottom, said first gap being formed between the outer surface of said rear end and the inner surface of said hole of said head, and said second gap being formed between the outer surface of said protruding portion and said opening of said bottom.

6. The safety core of claim 5 wherein said protruding portion has a stop, and said resilient means which normally maintains said stop valve in a closed position comprises a cylindrical spring located between said head portion and said stop.

7. The safety core of claim 6 wherein said protruding portion has the same configuration as a portion of a standard tire valve core for interaction with standard nozzle of a pressure supply system.

8. The safety core of claim 7 wherein said stop valve comprises a valve seat on the side of said cylindrical body facing said head portion, a front end face of said head portion, and said cylindrical spring between said head portion and said stop.

9. The safety core of claim 1 wherein said spring-loaded choke valve comprises a valve seat on the side of said pipe inserted into said cylindrical body, a ball located in said bore of said cylindrical body and engageable with said seat, and a spring inserted into said bore and normally urging said ball to said seat with an adjustable force determined by position of said pipe with respect to said cylindrical body, said cylindrical body further having at least one transverse hole connecting said bore with said first gap, said adjustable force corresponding to the upper allowable pressure of said tire.

10. The safety core of claim 1 wherein the overall dimensions and external configurations of said core essentially the same as a standard valve core of a standard tire valve housing.

11. A safety core for a tire valve, comprising:
    means for attaching said core to a standard tire valve housing, which housing is connected to a tire chamber, and means for sealingly engaging said core with an inner wall of said standard tire valve housing;
    a head portion having a hole;
    a cylindrical body slidingly inserted into said hole of said head portion so as to form first and second gaps which are connected to the atmosphere, said cylindrical body having a bore;

a stop vale between said head portion and said cylindrical body;

resilient means normally maintaining said stop valve in a closed position;

a pipe adjustably inserted into said bore of said cylindrical body;

a spring-loaded choke valve in said bore between said pipe and said first gap, said choke valve normally closing communication between said pipe and said first gap; and a third gap formed between the outer periphery of said cylindrical body and the inner surface of said standard tire valve housing, said third gap and the interior of said pipe being connected to said tire chamber, said choke valve being closed by a force adjusted to a predetermined upper allowable pressure for said tire chamber, said means for attaching said core to a standard tire valve housing comprising a head with an outer thread engageable with an inner thread in said standard tire valve housing, said head portion having a tapered portion with an annular groove, and said means for sealingly engaging said inner wall of said standard tire valve housing comprising a resilient seal ring inserted into said groove.

12. The safety core of claim 11 wherein said head portion has means for screwing it into said standard tire valve housing by means of an end wrench, said means for screwing said head portion comprise two diametrically arranged flats formed on said head of said head portion.

13. The safety core of claim 11 wherein said cylindrical body has a rear end, a large-diameter portion on the end facing said tire chamber, and a small-diameter portion on the side opposite to said tire chamber, said head portion having a bottom with an opening, said small-diameter portion protruding through said opening of said bottom, said first gap being formed between the outer surface of said rear end and the inner surface of said hole of said head, and said second gap being formed between the outer surface of said protruding portion and said opening of said bottom.

14. The safety core of claim 13 wherein said protruding portion has a stop, and said resilient means normally maintaining said stop valve in a closed position comprises a cylindrical spring located between said head portion and said stop, said protruding portion has the same configuration as a portion of a standard tire valve core for interaction with standard nozzle of a pressure supply system.

15. The safety core of claim 14 wherein said stop valve comprises a valve seat on the side of said cylindrical body facing said head portion, a front end face of said head portion, and said cylindrical spring between said head portion and said stop.

16. The safety core of claim 11 wherein said spring-loaded choke valve comprises a valve seat on the side of said pipe inserted into said cylindrical body, a ball located in said bore of said cylindrical body and engageable with said seat on said pipe, and a spring inserted into said bore and normally urging said ball to said seat with an adjustable force determined by position of said pipe with respect to said cylindrical body, said cylindrical body further having at least one transverse hole connecting said bore with said first gap, said adjustable force corresponding to the upper allowable pressure of said tire.

* * * * *